United States Patent
Huang et al.

(10) Patent No.: US 10,791,374 B2
(45) Date of Patent: Sep. 29, 2020

(54) METHOD FOR SHARING VIDEO CLIP IN REAL TIME

(71) Applicant: OTVCLOUD INFORMATION TECHNOLOGY CO., LTD., Shanghai (CN)

(72) Inventors: Sijun Huang, Shanghai (CN); Youneng Xiao, Shanghai (CN); Zhenfeng Sun, Shanghai (CN); Wei Ying, Shanghai (CN); Feipeng Ling, Shanghai (CN); Xiaowei Zhang, Shanghai (CN)

(73) Assignee: OTVCLOUD INFORMATION TECHNOLOGY CO., LTD., Shanghai (CN)

( * ) Notice: Subject to any disclaimer, the term of this patent is extended or adjusted under 35 U.S.C. 154(b) by 114 days.

(21) Appl. No.: 15/771,209

(22) PCT Filed: Jun. 15, 2016

(86) PCT No.: PCT/CN2016/085790
§ 371 (c)(1),
(2) Date: Sep. 17, 2018

(87) PCT Pub. No.: WO2017/071234
PCT Pub. Date: May 4, 2017

(65) Prior Publication Data
US 2019/0007743 A1 Jan. 3, 2019

(30) Foreign Application Priority Data
Oct. 29, 2015 (CN) .......................... 2015 1 0730670

(51) Int. Cl.
*G06Q 50/00* (2012.01)
*H04N 21/4788* (2011.01)
(Continued)

(52) U.S. Cl.
CPC ......... *H04N 21/4788* (2013.01); *G06Q 30/02* (2013.01); *G06Q 50/01* (2013.01);
(Continued)

(58) Field of Classification Search
None
See application file for complete search history.

(56) References Cited

U.S. PATENT DOCUMENTS 6,774,926 B1 * 8/2004 Ellis ................... H04N 5/44543
348/14.01
2015/0074700 A1 3/2015 Danovitz

FOREIGN PATENT DOCUMENTS

CN 103096182 A 5/2013
CN 103647991 A 3/2014
(Continued)

*Primary Examiner* — Cai Y Chen
(74) *Attorney, Agent, or Firm* — Global IP Services; Tianhua Gu

(57) ABSTRACT

A method for sharing a video clip in real time, comprising the following steps: S1: when finding an interesting clip when watching a video by a viewer, directly selecting to share the clip in a playing interface; S2: sending a request to a video sharing service system by using a current moment as an end moment by a player; S3: accepting the request sent by the player and returning a playable address including a sharing number by the video sharing service system; S4: sending a sharing request to a social platform by the player, wherein the sharing request comprises the playable address comprising the sharing number that is returned in S3; S5: processing the sharing request in step S4 while notifying a person with whom a message is shared of a message by the social platform; and S6: accessing the playable address comprising the sharing number by the person with whom a message is shared.

2 Claims, 3 Drawing Sheets

(51) Int. Cl.
*H04N 21/8352* (2011.01)
*H04N 21/254* (2011.01)
*H04N 21/658* (2011.01)
*H04N 21/845* (2011.01)
*G06Q 30/02* (2012.01)
*H04N 21/44* (2011.01)
*H04N 21/8549* (2011.01)

(52) U.S. Cl.
CPC ........... *H04N 21/254* (2013.01); *H04N 21/44* (2013.01); *H04N 21/6581* (2013.01); *H04N 21/8352* (2013.01); *H04N 21/8455* (2013.01); *H04N 21/8456* (2013.01); *H04N 21/8549* (2013.01)

(56) References Cited

FOREIGN PATENT DOCUMENTS

| | | |
|---|---|---|
| CN | 104717559 A | 6/2015 |
| CN | 104796795 A | 7/2015 |
| CN | 104901945 A | 9/2015 |

* cited by examiner

METHOD FOR SHARING VIDEO CLIP IN REAL TIME

CROSS REFERENCE TO RELATED PATENT APPLICATION

The present application is the US national stage of PCT/CN2016/085790 filed on Jun. 15, 2016, which claims the priority of the Chinese patent application No. CN201510730670.3 filed on Oct. 29, 2015, which application is incorporated herein by reference.

BACKGROUND OF THE PRESENT INVENTION

Field of Invention

The present invention relates to a design method for sharing a video clip in real time.

Description of Related Arts

As various devices including mobile phones are equipped with capabilities of network communication and video playing. People watch a large quantity of online videos for entertainment and obtaining information. With the rise of social platforms, sharing clips of videos during watching has gradually become an important manner for people to communicate messages and exchange feelings.

The foregoing video clip sharing is currently concentrated on two methods. In a first method, a viewer downloads a video, clips the video and then shares the video clip. In a second method, the viewer directly shares the entire video, together with time information of a clip.

For the first method, the viewer first needs to download to obtain a video including a clip, then clip, by using a video editing tool, the clip that needs to be shared, and then share the clip by using a social platform. Obviously, such a method takes a large quantity of time for the viewer to download. Further, the method can only be completed when the viewer knows professional knowledge such as video editing. Compared with an impulse of sharing the clip, this threshold is excessively high. FIG. 1 shows a processing procedure of clipping the video and then sharing the video after downloading the video by the viewer, comprising the following steps. Step 10: A viewer finds a video clip that needs to be shared when watching a video. Step 11: The viewer downloads the video. Step 12: The viewer clips the video by using video editing software to generate the video clip that needs to be shared. Step 13: The viewer shares the video clip generated in step 12 by using a social platform. Step 14: The social platform notifies a person with whom a message is shared of a sharing message. Step 15: The person with whom a message is shared plays the video clip to obtain information and feelings transferred by the viewer through the video clip.

For the second method, the viewer first shares information about the entire video to a social platform. The time information of the clip needs to be simultaneously added. While a person with whom a message is shared first needs to locate the clip based on the time information of the clip during watching and then enjoys the shared video clip. Obviously, this manner simplifies the sharing of video by the viewer. However, the person with whom a message is shared needs to locate on the entire video. A complex operation quite easily reduces a watching motivation of the person with whom a message is shared, thereby reducing an actual effect of the sharing by the viewer. FIG. 2 shows a processing procedure of directly sharing the entire video and clip time information by the viewer, including the following steps. Step 20: A viewer finds a video clip that needs to be shared when watching a video. Step 21: The viewer shares an entire video by using a social platform, together with start moment information of the clip. Step 22: The social platform notifies a person with whom a message is shared of a sharing message, comprising information about the entire video and the start moment information in step 21. Step 23: The person with whom a message is shared plays the entire video, and locates a wonderful moment through a continuous attempt based on the start moment information, so as to obtain information and feelings transferred by the viewer though the video clip.

Therefore, how to facilitate the viewer and the person with whom a message is shared at the same time and improve a communication effect based on a video clip is an urgent problem to be solved by those skilled in the art.

SUMMARY OF THE PRESENT INVENTION

In view of the foregoing problem in the prior art, a main object consistent with the present invention is to resolve defects in the prior art. The present invention provides a design method for sharing a video clip in real time to facilitate one-click sharing by a viewer without any waiting, at the same time, the person with whom a message is shared can directly enjoy the clip, thereby improving the effect of communication and exchanging between the viewer and the person with whom a message is shared through the video clip.

The present invention provides a design method for sharing a video clip in real time, comprising the following steps:

S1: when finding an interesting clip when watching a video by a viewer, directly selecting to share the clip in a playing interface;

S2: sending a request to a video sharing service system by using a current moment as an end moment by a player, wherein request information comprises a video number and the end moment;

S3: accepting the request sent by the player, recording the video number and the end moment of the video that needs to be shared, calculating a start moment of the clip based on time length configuration of the shared clip, and returning a playable address comprising a sharing number after processing by the video sharing service system, wherein the address points to the video sharing service system;

S4: sending a sharing request to a social platform by the player, wherein the sharing request comprises the playable address comprising the sharing number that is returned in step S3, a video screenshot, and other necessary information such as a social platform identity;

S5: processing the sharing request in step S4 while notifying a person with whom a message is shared of a message by the social platform; and S6: accessing the playable address comprising the sharing number by the person with whom a message is shared, and returning to a specified video clip from the start moment to the end moment in step S2 by the video sharing service system, so that the person with whom a message is shared directly starts to enjoy the clip.

The present invention has the following advantages and beneficial effects: The present invention provides a design method for sharing a video clip in real time. The method is to resolve, when a video clip is shared, complexity of clipping and then uploading a video to a viewer after the video is downloaded originally, or to resolve a problem caused when an entire video is shared and a person with whom a message is shared positions a clip when re-watching the video. Consequently, the viewer is unwilling to share the video clip or the person with whom a message is shared is unwilling to watch the video. A characteristic consistent with the present invention is that when finding a wonderful video clip, the viewer does not need to download and clip but to share the clip in a player in real time. After receiving a sharing message, the person with whom a message is shared does not need to look for a start moment of the clip in the entire video but to directly play from the clip. In this way, usage thresholds of both the viewer and the person with whom a message is shared are simultaneously lowered.

DETAILED DESCRIPTION OF THE PREFERRED EMBODIMENTS

The following further describes the present invention with reference to the accompanying drawings and specific embodiments.

Figure 1:
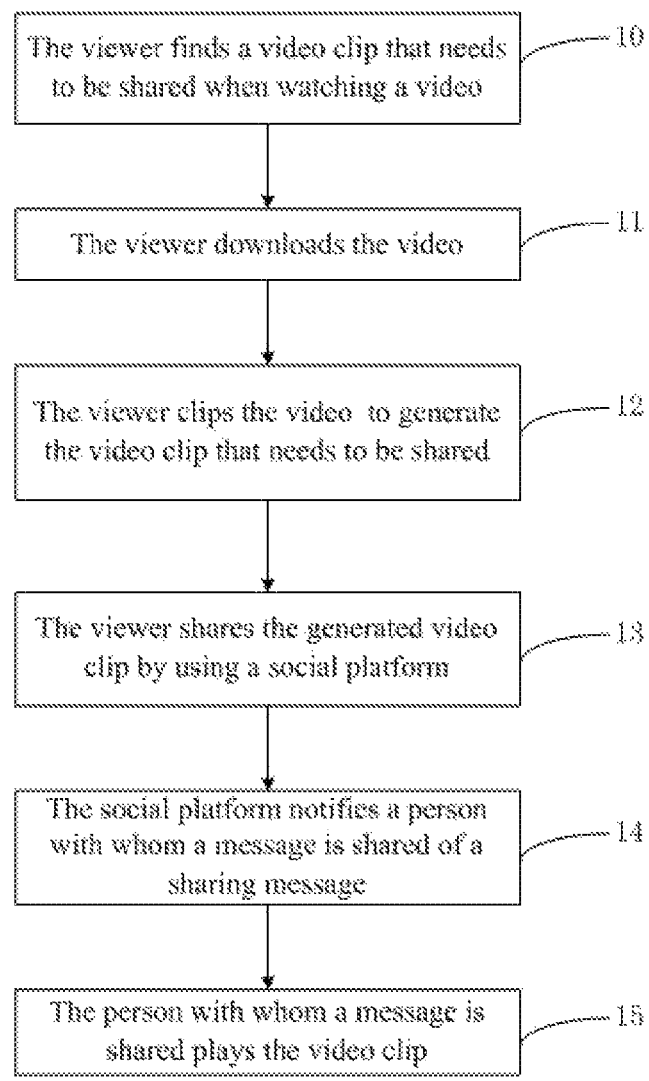
FIG. 1 is a processing flowchart of clipping a video and then sharing the video after downloading the video by a viewer in the prior art.
Figure 2:
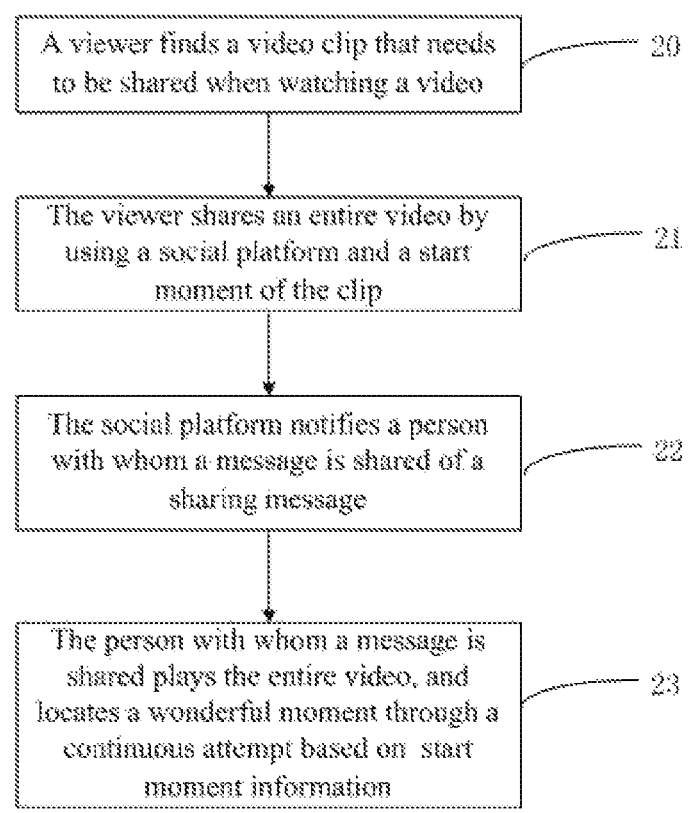
FIG. 2 is a processing flowchart of directly sharing an entire video and clip time information by a viewer in the prior art.
Figure 3:
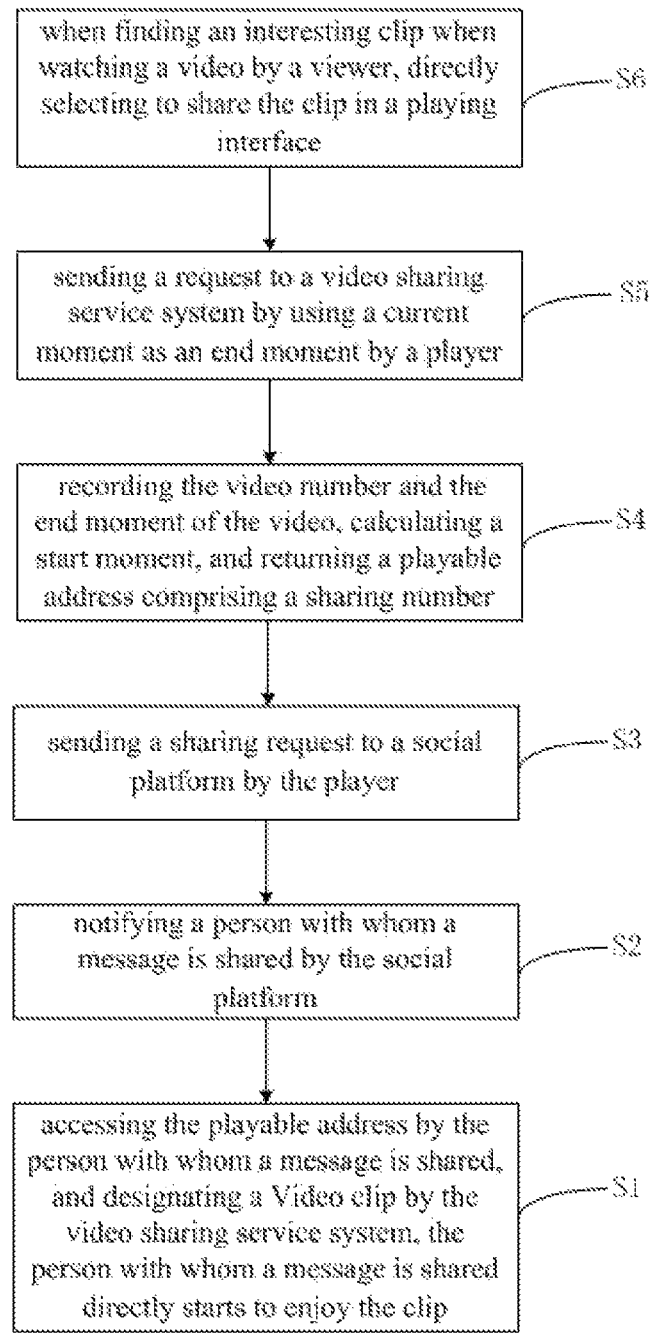
FIG. 3 is a flowchart of a design method for sharing a video clip in real time according to an embodiment of the present invention.

As shown in FIG. 3, a design method for sharing a video clip in real time according to an embodiment of the present invention comprises the following steps: S1: when finding an interesting clip when watching a video by a viewer, directly selecting to share the clip in a playing interface; S2: sending a request to a video sharing service system by using a current moment as an end moment by a player, wherein request information comprises a video number and the end moment; S3: accepting the request sent by the player, recording the video number and the end moment of the video that needs to be shared, calculating a start moment of the clip based on time length configuration of the shared clip, and returning a playable address comprising a sharing number after processing by the video sharing service system, wherein the address points to the video sharing service system; S4: sending a sharing request to a social platform by the player, wherein the sharing request comprises the playable address comprising the sharing number that is returned in step S3, a video screenshot, and other necessary information such as a social platform identity; S5: processing the sharing request in step S4 while notifying a person with whom a message is shared of a message by the social platform; and S6: accessing the playable address comprising the sharing number by the person with whom a message is shared, and returning to a specified video clip from the start moment to the end moment in step S2 by the video sharing service system, so that the person with whom a message is shared directly starts to enjoy the clip. The present method is to resolve, when a video clip is shared, complexity of clipping and then uploading a video to a viewer after the video is downloaded originally, or to resolve a problem caused when an entire video is shared and a person with whom a message is shared positions a clip when re-watching the video. Consequently, the viewer is unwilling to share the video clip or the person with whom a message is shared is unwilling to watch the video. A characteristic consistent with the present invention is that when finding a wonderful video clip, the viewer does not need to download and clip but to share the clip in a player in real time. After receiving a sharing message, the person with whom a message is shared does not need to look for a start moment of the clip in the entire video but to directly play from the clip. In this way, usage thresholds of both the viewer and the person with whom a message is shared are simultaneously lowered.

In the present invention, an embodiment based on an Http Live Streaming (HLS) media protocol is as follows. Wherein a transport stream (TS) is a fragmented media file, and a time length of each fragment of TS file is S. This embodiment comprises the following steps.

Step one: When watching a video A and finding a wonderful video clip, a user selects to share the video clip, a current moment being T0.

Step two: A player sends a request to a video sharing service system, wherein the request comprises video information and an index N of a TS file being played at present.

Step three: The video sharing service system generates a sharing record and a corresponding m3u8 file based on information in the request in step 41 and returns a playable address comprising a sharing number. Specifically, the step comprises the following steps.

Step 1: The video sharing service system calculates an index M of the TS file corresponding to a start moment of the shared clip. The video sharing service system obtains a current clip length L based on preset configuration, the index M of the TS file corresponding to the start moment of the clip is equal to N−L/S−1, wherein L/S is an integer division and a remainder is rounded off. If M<0, take M=0.

Step 2: When the video A is a live video, the video sharing service system marks that the TS file from M to N is shared and referenced, preventing the TS file from M to N from being cleared up.

Step 3: The video sharing service system generates the m3u8 file comprising the $M^{th}$ slice of TS to the $N^{th}$ slice of TS and the corresponding sharing number, and returns the playable address comprising the sharing number to the player, wherein the address points to the video sharing service system.

Step 4: After receiving the playable address returned in step 3, the player sends a sharing request to a social platform, wherein the sharing request comprises the playable address returned in step 2, a video screenshot obtained by the player, and other necessary information such as a social platform identity.

Step 5: The social platform notifies a person with whom a message is shared of a sharing message of the video clip.

Step 6: The person with whom a message is shared accesses the playable address comprising the sharing number, a video service system returns the m3u8 file generated in step 3, the index starting the TS is M and the index ending the TS is N.

Step 7: A player of the person with whom a message is shared directly plays from the TS of the index of M according to the HLS protocol.

Finally, it should be noted that the foregoing embodiment is merely intended for describing the technical solutions consistent with the present invention instead of limiting the present invention. Although the present invention is described in detail with reference to the foregoing embodiment, those skilled in the art should understand that they may still make modifications to the technical solutions described in the foregoing embodiment, or make equivalent substitutions to some or all technical features thereof, without departing from the spirit and scope of the technical solutions according to the embodiments of the present invention.

What is claimed is:

1. A method for sharing a video clip in real time, comprising the following steps:

S1: when finding an interesting clip when watching a video by a viewer, directly selecting to share the clip in a playing interface;

S2: sending a request to a video sharing service system by using a current moment as an end moment by a player, wherein request information comprises a video number and the end moment;

S3: accepting the request sent by the player, recording the video number and the end moment of the video that needs to be shared, calculating a start moment of the clip based on time length configuration of the shared clip, and returning a playable address comprising a sharing number after processing by the video sharing service system, wherein the address points to the video sharing service system; wherein a current clip to be shared has a length L, which is from the start moment to the end moment;

S4: sending a sharing request to a social platform by the player, wherein the sharing request comprises the playable address comprising the sharing number that is returned in step S3, a video screenshot, and other necessary information such as a social platform identity;

S5: processing the sharing request in step S4 while notifying a person with whom a message is shared by the social platform;

S6: accessing the playable address comprising the sharing number by the person with whom a message is shared, and accessing to the current clip with length L from the start moment to the end moment in step S3 by the video sharing service system, so that the person with whom a message is shared directly starts to enjoy the clip;

wherein the video is based on an Http Live Streaming (HLS) media protocol a transport stream (TS) is a fragmented media file, and a time length of each fragment of the TS file is S;

the method comprises the following steps:

S1: when watching the video and finding a wonderful video clip, the viewer selects to share the video clip, a current moment being T0;

S2: the viewer sends a request to the video sharing service system, wherein the request comprises video information and an index N of a TS file being played at present;

S3: the video sharing service system generates a sharing record and a corresponding m3u8 file based on information in the request in S2 and returns a playable address comprising a sharing number:

the S3 comprises the following steps:

step 1: the video sharing service system calculates an index M of the TS file corresponding to a start moment of the shared clip, the video sharing service system obtains a current clip length L based on preset configuration, the index M of the TS file corresponding to the start moment of the clip is equal to N−L/S−1, wherein L/S is an integer division and a remainder is rounded off, if M<0, take M=0;

step 2: when the video is a live video, the video sharing service system marks that the TS file from M to N is shared and referenced, preventing the TS file from M to N from being cleared up;

step 3: The video sharing service system generates the m3u8 file comprising the Mth slice of TS to the N*11 slice of TS and the corresponding sharing number, and returns the playable address comprising the sharing number to the player, wherein the address points to the video sharing service system;

S4: after receiving the playable address returned in S3, the player sends a sharing request to a social platform, wherein the sharing request comprises the playable address returned in S2, a video screenshot obtained by the player, and a social platform identity;

S5: the social platform notifies a person with whom a message is shared of a sharing message of the video clip;

S6: the person with whom a message is shared accesses the playable address comprising the sharing number, a video service system returns the m3u8 file generated in step 3;

the index starting the TS is M and the index ending the TS is N; and S7: a player of the person with whom a message is shared directly plays from the TS of the index of M according to the HLS protocol.

2. A player, performing the method for sharing a video clip in real time in claim 1.

* * * * *